United States Patent
Sorensen et al.

(10) Patent No.: US 10,040,200 B2
(45) Date of Patent: Aug. 7, 2018

(54) METHOD FOR MARKING, ROBOT UNIT FOR PAINTING STRIPES, AND USE HEREOF

(71) Applicant: Intelligent Marking ApS, Hjorring (DK)

(72) Inventors: Anders Ulrik Sorensen, Hjorring (DK); Andreas Ydesen, Hjorring (DK)

(73) Assignee: Intelligent Marking ApS (DK)

( * ) Notice: Subject to any disclaimer, the term of this patent is extended or adjusted under 35 U.S.C. 154(b) by 0 days.

(21) Appl. No.: 15/304,508

(22) PCT Filed: Mar. 19, 2015

(86) PCT No.: PCT/DK2015/050057
§ 371 (c)(1),
(2) Date: Oct. 14, 2016

(87) PCT Pub. No.: WO2015/158347
PCT Pub. Date: Oct. 22, 2015

(65) Prior Publication Data
US 2017/0036351 A1    Feb. 9, 2017

(30) Foreign Application Priority Data

Apr. 16, 2014 (DK) .................................. 2014 00217
Nov. 18, 2014 (DK) .................................. 2014 70710

(51) Int. Cl.
*G01C 22/00* (2006.01)
*G05D 1/00* (2006.01)
(Continued)

(52) U.S. Cl.
CPC ........... *B25J 11/0075* (2013.01); *B05B 12/00* (2013.01); *B05B 12/22* (2018.02); *B05B 13/005* (2013.01);
(Continued)

(58) Field of Classification Search
CPC . B60T 1/062; B60T 1/005; B60T 8/58; F16D 63/00; B05B 12/00; B05B 12/22;
(Continued)

(56) References Cited

U.S. PATENT DOCUMENTS

| 5,540,516 A * | 7/1996 | Nicodemo ............. A63C 19/00 15/79.1 |
| 5,838,277 A * | 11/1998 | Loomis .................... G01S 19/14 342/357.52 |
| 6,729,706 B1 * | 5/2004 | Patton ........................ B41J 2/01 347/2 |
| 8,021,077 B2 * | 9/2011 | Annese ................. E01C 23/222 118/305 |

(Continued)

FOREIGN PATENT DOCUMENTS

| DE | 8713884 | 2/1988 |
| DE | 9301759 | 5/1993 |

OTHER PUBLICATIONS

English translation for reference DE8713884 (Year: 1988).*

*Primary Examiner* — Rachid Bendidi
(74) *Attorney, Agent, or Firm* — Ware, Fressola, Maguire & Barber LLP

(57) ABSTRACT

The invention relates to a method for marking sports field by placing stripes of paint according to a predefined plan via a spraying nozzle on a level playing surface such as grass, gravel, ice, artificial grass or synthetic material field. A robot unit is provided that is configured to move along the stripes according to the predefined plan. The robot unit receives signals from a number of GPS sending units and continuously calculates its current position on the sports field, and uses the current position on the sports field to calculate a set of control signals to two or more movable elements for propulsion of the unit and for controlling the emission of paint. The invention also relates to a robot unit and use of a robot unit for marking fields.

12 Claims, 3 Drawing Sheets

(51) Int. Cl.
- *B25J 11/00* (2006.01)
- *B05B 12/00* (2018.01)
- *B05B 13/00* (2006.01)
- *B05B 12/22* (2018.01)
- *A63C 19/06* (2006.01)
- *E01C 23/22* (2006.01)
- *G01S 19/42* (2010.01)

(52) U.S. Cl.
CPC .... *A63C 2019/067* (2013.01); *A63C 2203/24* (2013.01); *E01C 23/222* (2013.01); *G01S 19/42* (2013.01); *Y10S 901/01* (2013.01)

(58) Field of Classification Search
CPC ............... B05B 13/005; B25J 11/0075; A63C 2203/24; E01C 23/222; G01S 19/42; Y10S 901/01
See application file for complete search history.

(56) References Cited

U.S. PATENT DOCUMENTS

| | | | |
|---|---|---|---|
| 8,467,968 B1* | 6/2013 | Dolinar | E01C 23/163 701/439 |
| 9,298,991 B2* | 3/2016 | Dolinar | G01C 15/02 |
| 2004/0164182 A1 | 8/2004 | Joseph | |
| 2007/0059098 A1* | 3/2007 | Mayfield | A63C 19/06 404/84.5 |
| 2007/0131793 A1* | 6/2007 | Joseph | B05B 7/2408 239/302 |
| 2009/0114738 A1* | 5/2009 | Annese | E01C 19/004 239/69 |
| 2011/0057052 A1 | 3/2011 | Heatley | |
| 2012/0056020 A1* | 3/2012 | Philpotts | E01C 23/22 239/722 |

* cited by examiner

METHOD FOR MARKING, ROBOT UNIT FOR PAINTING STRIPES, AND USE HEREOF

CROSS-REFERENCE TO RELATED APPLICATIONS

This application is a U.S. national stage of International Appl. No. PCT/DK2015/050057 filed Mar. 19, 2015, which claimed priority to Danish Appl. Nos. PA 2014 00217 filed Apr. 16, 2014 and PA 2014 70710 filed 18, Nov. 2014, which applications are all incorporated herein by reference in their entireties.

TECHNICAL FIELD

The invention relates to a method for marking a playing surface, and a robot unit especially suited for marking grass areas, artificial grass and other types of field cover, including football, baseball, cricket fields and other facilities where field marking is used, equipped with container for paint and device for creating stripes of paint on playing surface.

The invention also relates to use of the self-propelled marking robot for marking of grass areas, artificial grass and other types of field cover, including football, baseball, cricket fields and other facilities where field marking are used, marking of indoor areas, including ice hockey fields and marking of other outdoor areas, including parking spaces, schoolyards and other asphalted areas.

BACKGROUND

When marking football fields and other sports fields, manual vehicles are mostly used, which require operation by personnel during the whole marking. These vehicles often consist of 3 or 4 wheels attached to a frame, one or more containers for chalk solution attached to the frame and a guideway with control to the rate of chalking. Vehicles with 3 wheels in most cases use front wheel for direction finding, whilst vehicles with 4 wheels have typically got an attached direction finder. By often re-checking, it is in most cases possible to find direction according to the previous marking, but at longer time without marking or after periods with heavy rain, it can be necessary to place direction cords to ensure regular marking.

There are several drawbacks by manual marking.

The marking is time-consuming, especially if there has to be placed direction cords before the marking.

It is expensive in salary, in the case that volunteers can not be found.

There is risk of uneven marking, especially by circular markings.

Robot units, for instance controlled by GPS signals, have been proposed, but they have been difficult to operate, not least since paint and or chalk containers require supervision and filling, and there is risk of remains of paint or chalk, in not fully emptied containers, setting hard and thereby causing need for extensive service of the unit.

From US 2009/0114738 is known a robot unit for marking playing fields, but this unit has no safeguard against that the used paint is exposed to oxidation, since its surface is accessible for this.

From DE9301759U1 is known a field marker, which is manually operated, and includes containers, which are replaceable. But there is no explanation of how the paint in the container is protected from oxidation. Thus, there is a risk that a not fully emptied container, if it is left in the field marking, can lead to formation of congealed paint, which again can clog pump and hose systems.

SUMMARY OF THE INVENTION

It is therefore an object of the invention to show a robot unit, which is quick and easy to operate and where filling of paint can occur quickly and easily, and where the paint is secured against oxidization before it is added to the surface.

According to one or more exemplary embodiments of the present invention, the stripes are formed on the surface during the unit's movement by paint being pumped from a reservoir to a spraying nozzle and is submitted to the playing surface in accordance to control signals, since the paint is added to the reservoir consisting of portions of replaceable bag in box type, which is connected to the pump. It is hereby ensured that the paint does not come in contact with oxygen before it leaves the nozzle and, at the same time, supplying extra paint to the reservoir is easy, since the replaceable bag in box units are easily connected and disconnected the pump connection without waste of paint.

According to one or more exemplary embodiments of the present invention, the paint is passed through a connection pipe to the pump, is pressurized in the pump and is directed from the pump under pump pressure in a nozzle pipe to the spraying nozzle where the paint is released during spreading. Hereby is achieved the advantage that the pump is freely positionable a suitable place on the robot unit. The pump can be designed as a piston pump or alternatively as a peristaltic pump, which has the additional advantage that the moving parts of the pump do not come into contact with the paint.

According to one or more exemplary embodiments of the present invention, it is preferred that the paint is supplied to the pump via a manifold, where paint from several different bag in box containers are joined to a stream. Hereby, the total paint reservoir will always consist of all the bag in box units, which are connected to the manifold, and there is no need for reverses between the different connected bag in box portions.

According to one or more exemplary embodiments of the present invention, the spreading of the paint from the spraying nozzle is limited by a cover on each side of the spraying nozzle. This ensures that the line width does not vary during operation.

According to one or more exemplary embodiments of the present invention, the line width can be adjusted manually from the start of a marking. Alternatively, the adjustment can occur during laying out of stripes on the playing surface. Hereby, the robot unit becomes capable of laying out stripes in varying width, which can be advantageous in relation to certain branches of sport. It is also possible to adjust the spraying pressure from the pump and possibly at the same time adjust the spraying nozzle's geometry. It can hereby be ensured that there always occurs optimum release of paint from the nozzle according to the desired line width.

The invention also relates to a robot unit for painting stripes on a playing surface such as grass, gravel, ice, or synthetic material lanes where the robot unit via a control box is controlled by GPS signals. According to one or more exemplary embodiments of the present invention, the robot unit is provided with at least one replaceable container, which contains paint and includes an outer rigid framing element and an inner flexible bag, whereby a connecting pipe on the outside of the framing element is in fluid connection with the paint in the flexible bag, where the robot unit is further provided with at least one spraying nozzle and a pump which is pipe connected with the replaceable container and the spraying nozzle for release of paint during control of signals from the control box.

With such a robot unit, filling of paint becomes carried out by changing an emptied replaceable container with a full container. The paint does then not come into contact with the atmosphere before it leaves the spraying nozzle and evaporation of water or hardening of the paint in advance of laying out stripes is hereby prevented efficiently.

The outer framing element can here be a well-known cardboard or plastic bucket, which is a part of the replaceable container or the framing element can consist of a fixed part of the robot unit, such that it is only the inner bag, which is replaced when empty, or there is desired another type or color of the paint.

Appropriately, the connecting pipe includes, a quick clutch and a block tap. It can hereby be ensured that a quick connection between pump and reservoir is possible without waste of paint.

According to one or more exemplary embodiments of the present invention, it is appropriate if there are several replaceable containers on the robot unit, where each of them are pipe connected with the pump via a manifold, and where the outlet from the pump comprises a single nozzle pipe. A very simple and modular built system, is hereby achieved, where it is easy not only to replace the individual containers, but also where the different pipework can be replaced independently of each other should there occur clogging or other malfunction.

The robot unit is moved forward, by movable elements on each side of the spraying nozzle. A unit is hereby achieved where it is ensured that the movable elements as far as possible do not come into contact with new paint stripes, while ensuring a high manoeuvrability for the spraying nozzle, which for example will be able to rotate around its own axis and is brought to motion along virtually any preselected route.

The movable elements can include wheels, caterpillar tracks or alternatively pairs of segmented walking legs as it is gradually known from both four-legged and two-legged robots. Segmented walking legs have the advantage in connection with laying of stripes that they can be programmed such that they avoid stepping on newly laid down paint. It is expected that this type of robot legs and the associated control will fall significantly in price over the next years as they are becoming more and more popular not least driven by military technological applications.

The invention also relates to use of a robot unit, as specified, for marking grass areas, artificial turf and other types of field cover, including football, baseball, cricket fields and other facilities where field marking are used, marking of indoor areas, including ice hockey fields and marking of other outdoor areas, including parking lots, schoolyards and other paved areas.

The invention will now be explained more fully with reference to the drawings, in which:

DETAILED DESCRIPTION OF THE INVENTION

Figure 1:
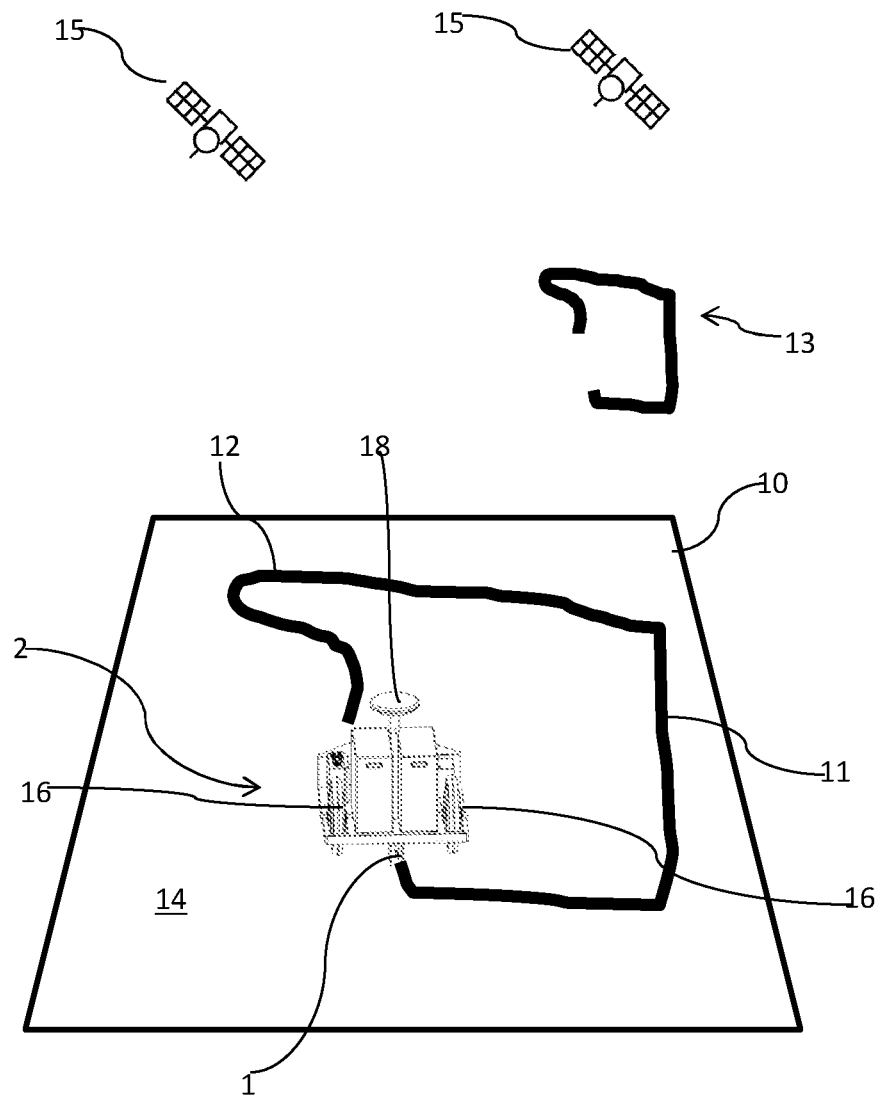
FIG. 1. shows schematic depiction of self-propelled unit on a sports field and GPS sending units.
Figure 2:
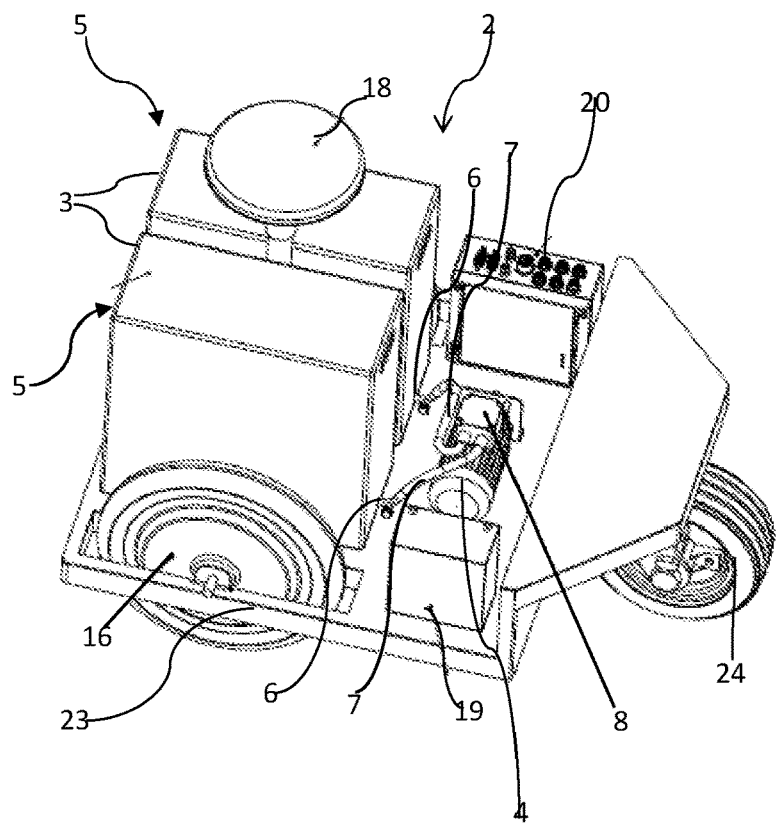
FIG. 2 shows the robot unit slanted from above.

In FIG. 1 is seen a sports field 10 on which there is to be placed stripes 11 from paint 12 according to a predefined plan 13. The paint 12 is applied to a playing surface 14 which is the part of the field 10, which is visible to the athlete during use of the field. The playing field 14 can be grass, gravel, ice, artificial turf, parquet or wood, synthetic material or otherwise, which is used in connection to sport, and the paint 12 is applied via a spraying nozzle 1, which is moved around on the sports field 10 by a robot unit 2 along the stripes 11, controlled by GPS signals from a number of GPS sending units 15, typically in the form of satellites 15 orbiting the earth. A GPS receiving antenna 18 is shown in FIGS. 1 and 2. The Robot unit 2 here constantly calculates its position on the field 10, such that it can constantly control two or more movable elements 16, such as wheels, whereby it can follow the predefined plan 13 for marking the sports field 10. The plan 13 will typically be embedded in a memory element, which forms part of a control box 20, and as it is well known, various plans can be loaded from an external device, such as a computer (not shown) if the robot unit 2 is to mark a sports field, for which there is already no plan in the control box 20. Parts of the control box's functionality can, as known from mobile robotic systems, be embedded in an external device such as a computer, which the robot unit is in continuous contact with, for example through a radio connection such as via WiFi or BlueTooth or corresponding RF protocol.

The robot unit will typically be provided with a number of sensors and safety devices such that there is achieved a reasonable precaution against the robot unit doing harm to pets, wild animals, children or objects that may be present on the sports field. Such sensors may for example comprise cameras for recording images in visible, UV or infrared spectrum, laser scanners, touch sensors, ultrasound or radar scanners and a more or less well-developed signal processing unit for analyzing sensor input.

Microphones and associated speech recognition module is also an option, such that random people in the robot's proximity can bring it to stop simply by shouting at it if any unforeseen situation should occur. Online connection to a human operator via for example a telephone connection could also be established for example in case of unusual sensory input, which it requires human capability to interpret. The operator can for example have an overview of a large number of robots since he is only supposed to intervene relatively infrequently, and he does not need to be near the playing field, but can sit anywhere as long as he is so close to the planet that the time delay due of the signal transmission over long distances does not become excessive.

FIG. 2 shows a robot unit 2 in schematic depiction. The unit 2 includes a reservoir 3 for paint 12, where the reservoir 3 includes portions 4 of the bag in box type, which are connected a joint pump 4 via a quick connection 6 and connection pipe 7. In the shown example, according to FIG. 2, there is placed two bag in box cartons 5 on the robot unit 2, but more portions of paint can be placed on a robot unit, for instance stacked in layers or side by side as shown. The robot unit 2 also includes a control box 20, a battery 19 and a chassis frame 23.

The bag in box cartons 5 thus comprise replaceable containers for paint. Either the whole bag in box carton 5 is replaced or it is only the bag 27 itself in the bag in box system, which is changed. The outer part 26 can here consist of a framing element consisting of a latticework (not shown), which sits mounted or is a part of the chassis frame 23.

Figure 5:
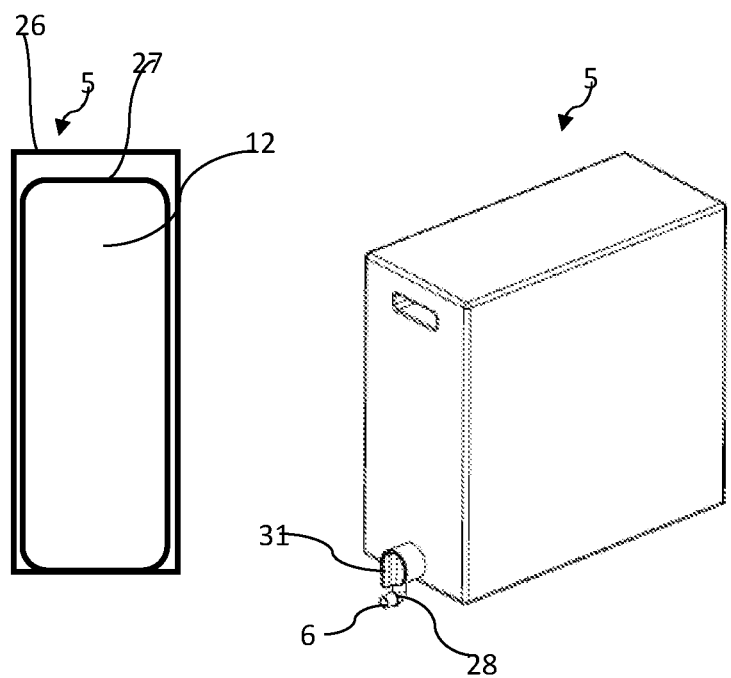

In FIG. 5 is seen the bag in box unit in cutaway and from the outside. The sectional drawing to the left in the figure illustrates the outer framing element 26 and the inner flexible bag 27. A connecting pipe 28 is provided externally on the framing element 26, and this pipe is in fluid connection with the paint in the bag 27. The connecting pipe 28 can be shaped as one part of a quick clutch 6. The pipe 7 will then be shaped with the corresponding part, such that the pipe can be connected easily and without waste to the connecting pipe 28 via the quick clutch 6. Appropriately, there will also be a block tap 31, either in connection with the connecting pipe 28 or in connection with the pipe 7. With such an arrangement, emptied and used paint containers can easily be changed and replaced by new filled containers.

The two connection pipes 7 are assembled at the pump 4 in a manifold 8.

Figure 3:
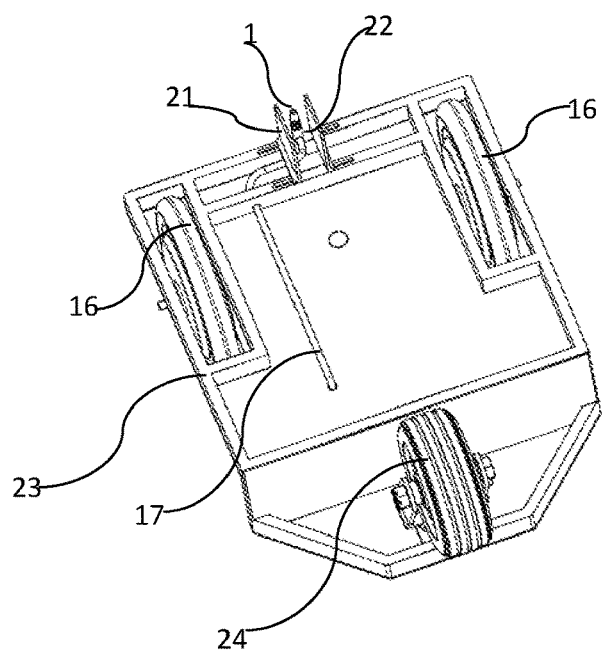
FIG. 3 shows the robot unit seen from below.
Figure 4:
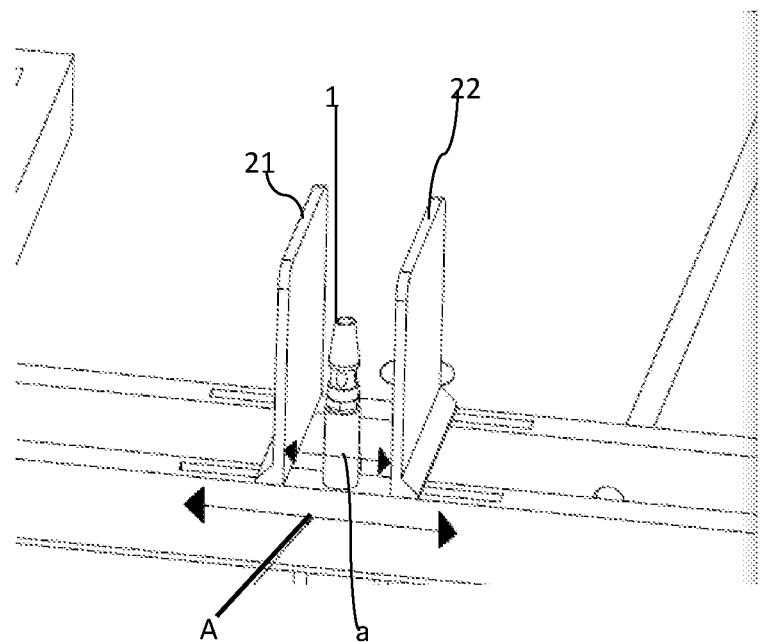
FIG. 4 shows the spraying nozzle and the guarding and FIG. 5 shows bag in box unit partly in cutaway and partly in a 3D line drawing.

From the pump 4, a single nozzle pipe 17 runs to the spraying nozzle 1 as shown in FIG. 3. On each side of the spraying nozzle 1 there is mounted a screen 21, 22 and at least one monitor 21 is designed adjustable in direction towards or away from the nozzle 1. This allows the width of the added stripe to be varied in the extent the nozzle 1 can reach according to a maximum spread radius. This will depend, as is known from paint nozzles, of the paint's rheology and the nozzle's outlet geometry and the pumping force. The setting of the one or two adjustable screens 21, 22 can occur manually, or it can occur automatically during operation, for example depending on which part of the marking is being performed. In FIG. 4, the arrow a shows the minimum distance and arrow A, the maximum distance between the screens 21, 22. An actuator (not shown) can be provided to influence one or both screens towards or away from the nozzle via signals from the control box.

The screens 21, 22 will during operation be applied paint 12, and even with a non-stick coating on the inside of the screens, there is a risk that, over time, there will build up a larger number of layers of old dry paint, which could interfere with the operation. The screens 21, 22 can for preventing this be replaceable. New screens can thus be supplied with each new batch of paint. Another possibility is to provide the inside of each screen with a self-adhesive foil, and then similarly deliver new self-adhesive foils with each batch of paint. Alternatively, the screens can be made from rubber-elastic material such that a user of the robotic unit by light bending of the screens can loosen possible deposits of old paint.

It is also possible to place the screens 21, 22 on an adjustable arm (not illustrated) such that the user can bring the displays from the relatively inaccessible position below the robot unit and forward to an easily accessible position.

The robot unit's movement around the sports field 10 is effected by movable elements 16 shown in the figures as wheels. Other moving elements can be used, for example caterpillar tracks or pairs of walking legs. Such legs that mimic the movements of insects or higher 4-legged animals, or two-legged living beings have become popular and have the advantage over wheels that they allow for movements over uneven surfaces, such as stairs, and in connection with the marking of sports fields, they have the particular advantage that they allow the robot unit 2 to move across newly out-sprayed paint without the stripe being tread on, such that the movable elements do not leave erroneous imprints of paint 12 on the playing surface 14.

FIG. 3 shows an embodiment where the robot unit has 2 driven wheels 16 and a non-driven wheel 24, where the non-driven wheel 24 sits mounted on the chassis frame 23 such that it can rotate around an axis, which is perpendicular to the wheel's axis of rotation. In this way the wheel can be made self-aligning such that the robot unit's movements are controlled by controlling the two driven wheels 16. Preferably, the wheels 16 are driven by respective electric motor in accordance with control signals from the control unit 20. The unit could also be four wheeled for achieving better stability and lower wheel pressure against the playing field's surface.

Preferably, the nozzle 1 is provided between the two movable elements 16. This causes that the robot unit quite simply can place stripes, which have a non linear course or which create geometric figures such as right or apex angles.

USED DESCRIPTIONS 1 spraying nozzle
2 robot unit
3 reservoir
4 pump
5 portions
6 quick clutch
7 connection pipe
8 manifold
10 sports field
11 stripes
12 paint
13 predefined plan
14 playing surface
15 GPS sending units
16 movable elements
17 nozzle pipe
18 GPS receiving antenna
19 battery
20 control box
21 adjustable screen
22 screen
23 chassis frame
24 additional wheel
26 framing element
27 flexible bag
28 connecting pipe
31 block tap

The invention claimed is:
1. A method for marking a sports field according to a predefined plan, comprising:
providing a robot unit comprising a reservoir configured to contain paint in replaceable containers in the form of bag in box type containers comprising an outer rigid framing element and an inner flexible bag, a control box configured to receive GPS signals and two or more movable elements configured for propulsion of the robot unit,
connecting said one or more containers through a connecting pipe to a pump connected to a spraying nozzle, by bringing said connecting pipe on the outside of the framing element in fluid connection with the paint in the flexible bag,
receiving, by the control box of the robot unit, one or more GPS signals from one or more GPS sending unit,
continuously calculating, by the control box of the robot unit, a current position of the robot unit on the sports field, calculating, by the control box of the robot unit, a set of control signals for the two or more movable elements and emission of paint from the spraying nozzle of the robot unit, pumping, by the control box of the robot unit, paint from the reservoir to the spraying nozzle in response to one or more of the set of control signals, forming one or more strips in accordance with the predefined plan during movement of the robot unit and emission of paint from the spraying nozzle in response to the set of control signals, limiting the spreading of the paint from the spraying nozzle by a cover on each side of the spraying nozzle for achieving a uniform line width, adjusting the cover automatically in relation to line width in the predefined plan by use of the current position of the robot unit on the sports field, wherein the outer rigid framing element of the replaceable bag in box type container is chosen between a cardboard or plastic bucket which is a part of the replaceable container or a fixed part of the robot unit.

2. The method according to claim 1, further comprising passing the paint through a connection pipe to the pump, pressurizing the paint in the pump, and directing the paint from the pump under pressure through a nozzle pipe to the spraying nozzle for release.

3. The method according to claim 2, further comprising the step of supplying the paint to the pump via a manifold such that the one or more portions of paint are arranged on the robot unit with each own connection pipe to the pump such that the one or more portions together form the reservoir.

4. A robot unit for marking a sports field according to a predefined plan, comprising:
    a reservoir configured to contain paint,
    two or more movable elements configured for propulsion of the robot unit,
    a control box configured to receive GPS signals, and configured to control the robot unit in response to the GPS signals,
    said reservoir comprises at least one replaceable container configured for containment of paint, wherein the replaceable container is a bag in box type container comprising an outer rigid framing element and an inner flexible bag, and wherein a connecting pipe on the outside of the framing element is in fluid connection with the paint in the flexible bag,
    at least one spraying nozzle and a pump connected with the replaceable container through said connecting pipe and the spraying nozzle for release of paint in response to commands received from the control box,
    wherein the control box is configured to continuous calculate a current position of the robot unit on the sports field,
    wherein the control box is configured to calculate a set of control signals for the two or more movable elements and emission of paint from the spraying nozzle of the robot unit,
    wherein the control box is configured to cause the pumping of paint from the reservoir to the spraying nozzle in response to one or more of the set of control signals,
    wherein on each side of the spraying nozzle there is provided at least one adjustable screen such that a predefined stripe width can be achieved by adjusting the distance between the at least one adjustable screens positioned on each side of the spraying nozzle, and wherein the outer rigid framing element of the replaceable bag in box type container is chosen between a cardboard or plastic bucket which is a part of the replaceable container or a fixed part of the robot unit.

5. The robot unit according to claim 4, wherein the connecting pipe comprises a quick clutch and a block tap.

6. The robot unit according to claim 5, wherein the robot unit comprises a plurality of replaceable containers are provided on the robot unit, with each replaceable container having its own connecting pipe, wherein each replaceable container is connected to a pump via a connection pipe and a manifold connecting the connecting pipes to the pump, and wherein a single additional nozzle pipe is provided between the pump and the spraying nozzle.

7. The robot unit according to claim 6, wherein the robot unit further comprises at least one movable element configured for contact with the playing surface and positioned on each side of the spraying nozzle for controlled propulsion of the robot unit.

8. The robot unit according to claim 7, wherein the movable elements on each side of the spraying nozzle are rotatable elements.

9. The robot unit according to claim 8, wherein the movable elements on each side of the spraying nozzle comprise pairs of multiple link walking legs.

10. The robot unit according to claim 8, wherein the rotatable elements are wheels or caterpillar tracks.

11. The robot unit according to claim 4, wherein at least one adjustable screen is adjustable by use of an actuator, wherein the actuator is connected to the control box and is controlled by control signals dependent on the position of the robot unit on the playing surface.

12. A method for painting stripes on a playing surface with a robot unit, wherein the robot unit comprises:
    a control box configured to receive GPS signals, and configured to control the robot unit in response to the GPS signals,
    at least one replaceable container configured for containment of paint, wherein the replaceable container is a bag in box type container comprising an outer rigid framing element and an inner flexible bag, and wherein a connecting pipe on the outside of the framing element is in fluid connection with the paint in the flexible bag,
    at least one spraying nozzle and a pump connected with the replaceable container through said connecting pipe and the spraying nozzle for release of paint in response to commands received from the control box,
    wherein on each side of the spraying nozzle there is provided at least one adjustable screen such that a predefined stripe width can be achieved by adjusting the distance between the at least one adjustable screens positioned on each side of the spraying nozzle and wherein the outer rigid framing element of the replaceable bag in box type container is chosen between a cardboard or plastic bucket which is a part of the replaceable container or a fixed part of the robot unit, and
    wherein the method comprises painting said stripes on grass areas, artificial grass and other types of field cover, including football, baseball, cricket fields and other facilities where field marking is used, marking of indoor areas including ice hockey field and marking of other outdoor areas including parking spaces, school yards and other paved areas.

* * * * *